United States Patent
Murota et al.

(10) Patent No.: US 10,536,208 B2
(45) Date of Patent: Jan. 14, 2020

(54) CONTROL DEVICE, ELECTRONIC DEVICE, AND CONTROL METHOD

(71) Applicant: SHARP KABUSHIKI KAISHA, Sakai, Osaka (JP)

(72) Inventors: Koichi Murota, Sakai (JP); Ayanori Nakajima, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/419,706

(22) Filed: May 22, 2019

(65) Prior Publication Data

US 2019/0363776 A1 Nov. 28, 2019

(30) Foreign Application Priority Data

May 25, 2018 (JP) .................................. 2018-100771

(51) Int. Cl.
*H04B 7/06* (2006.01)
*H01Q 1/24* (2006.01)
*H04B 1/04* (2006.01)

(52) U.S. Cl.
CPC ........... *H04B 7/0693* (2013.01); *H01Q 1/245* (2013.01); *H04B 1/0475* (2013.01)

(58) Field of Classification Search
CPC .. H04B 1/0475; H04B 1/0468; H04B 1/0483; H04B 7/0768; H04B 7/0786; H04B 7/07691; H04B 7/07693; H01Q 1/245; H04L 5/06; H04L 25/49

See application file for complete search history.

(56) References Cited

U.S. PATENT DOCUMENTS

| 2004/0046701 | A1* | 3/2004 | Huber | H01Q 1/245 343/702 |
|---|---|---|---|---|
| 2004/0095907 | A1* | 5/2004 | Agee | H04B 7/0417 370/334 |
| 2010/0136922 | A1* | 6/2010 | Rofougaran | H04B 1/0483 455/73 |
| 2014/0184440 | A1* | 7/2014 | Park | H04B 7/0871 342/351 |
| 2018/0269715 | A1* | 9/2018 | Hannigan | H02J 50/60 |

FOREIGN PATENT DOCUMENTS

| JP | 2003-283393 A | 10/2003 |
|---|---|---|
| JP | 2004-363863 A | 12/2004 |

* cited by examiner

*Primary Examiner* — Thanh C Le
(74) *Attorney, Agent, or Firm* — ScienBiziP, P.C.

(57) ABSTRACT

The present invention suppresses a deterioration of transmission performance and reduces an adverse effect on health of a user, irrespective of the kind of selected antennas. A control section includes antenna selecting section configured so that in a case where a plurality of signals are simultaneously transmitted and where a mobile communication terminal is in a certain use state, the antenna selecting section selects at least one of a first antenna through a fourth antenna so that a distribution range of power densities or of specific absorption rates have no overlapping portion or have an overlapping portion equal to or less than a certain range.

6 Claims, 7 Drawing Sheets

CONDITION TABLE T2

| | COMMUNICATION SYSTEM TO START SIMULTANEOUS COMMUNICATION | | | | |
|---|---|---|---|---|---|
| COMMUNICATION SYSTEM CURRENTLY USED | COMMUNICATION SYSTEM | Sys1 | | Sys2 | |
| | ANTENNA | A1 | A2 | A3 | A4 |
| | Sys1 A1 | — | 80 | 40 | 50 |
| | Sys1 A2 | 80 | — | 70 | 110 |
| | Sys2 A3 | 40 | 70 | — | 50 |
| | Sys2 A4 | 50 | 110 | 50 | — |

(b)

CONDITION TABLE T3

| COMMUNICATION SYSTEM | Sys1 | | Sys2 | |
|---|---|---|---|---|
| ANTENNA | A1 | A2 | A3 | A4 |
| WEIGHTING VALUE | 40 | 60 | 30 | 50 |

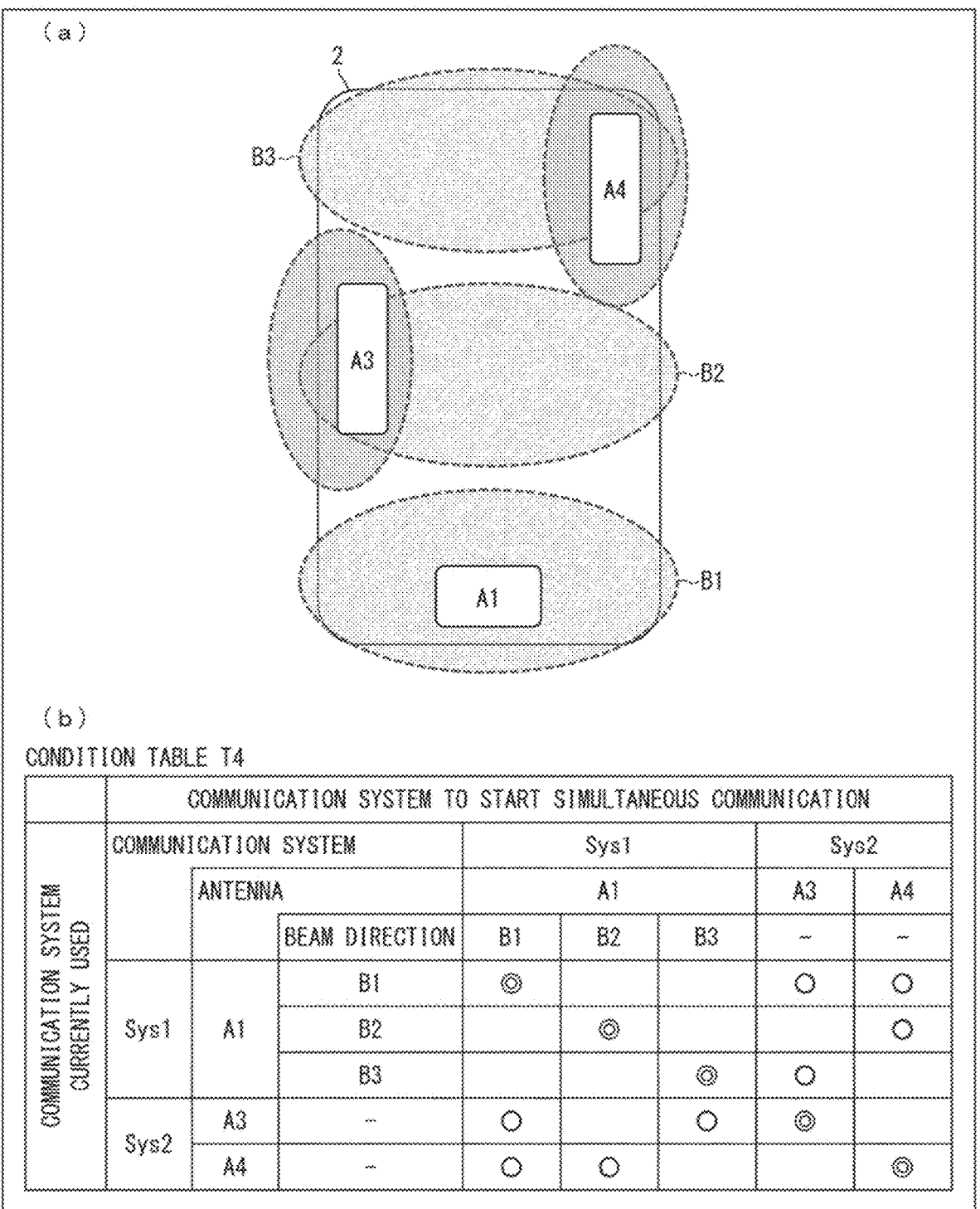

FIG. 7

(a) CONDITION TABLE T5 (CALL STATE)

| COMMUNICATION SYSTEM CURRENTLY USED | | COMMUNICATION SYSTEM TO START SIMULTANEOUS COMMUNICATION | | | | |
|---|---|---|---|---|---|---|
| | COMMUNICATION SYSTEM | Sys1 | | Sys2 | | |
| | ANTENNA | A1 | A2 | A3 | A4 |
| Sys1 | A1 | ◎ | | ○ | ○ |
| | A2 | | ◎ | ○ | ○ |
| Sys2 | A3 | ○ | ○ | ◎ | |
| | A4 | ○ | | | ◎ |

(b) CONDITION TABLE T6 (TERMINAL-HOLDING STATE)

| COMMUNICATION SYSTEM CURRENTLY USED | | COMMUNICATION SYSTEM TO START SIMULTANEOUS COMMUNICATION | | | | |
|---|---|---|---|---|---|---|
| | COMMUNICATION SYSTEM | Sys1 | | Sys2 | | |
| | ANTENNA | A1 | A2 | A3 | A4 |
| Sys1 | A1 | ◎ | | ○ | ○ |
| | A2 | | ◎ | ○ | |
| Sys2 | A3 | ○ | ○ | ◎ | ○ |
| | A4 | ○ | | ○ | ◎ |

(c) CONDITION TABLE T7 (MOVING IMAGE-VIEWING STATE)

| COMMUNICATION SYSTEM CURRENTLY USED | | COMMUNICATION SYSTEM TO START SIMULTANEOUS COMMUNICATION | | | | |
|---|---|---|---|---|---|---|
| | COMMUNICATION SYSTEM | Sys1 | | Sys2 | | |
| | ANTENNA | A1 | A2 | A3 | A4 |
| Sys1 | A1 | ◎ | ... | ... | ... |
| | A2 | ... | ◎ | ... | ... |
| Sys2 | A3 | ... | ... | ◎ | ... |
| | A4 | ... | ... | ... | ◎ |

(d) CONDITION TABLE T8 (STATE OF NOT BEING IN CONTACT WITH HUMAN BODY)

| COMMUNICATION SYSTEM CURRENTLY USED | | COMMUNICATION SYSTEM TO START SIMULTANEOUS COMMUNICATION | | | | |
|---|---|---|---|---|---|---|
| | COMMUNICATION SYSTEM | Sys1 | | Sys2 | | |
| | ANTENNA | A1 | A2 | A3 | A4 |
| Sys1 | A1 | ◎ | ○ | ○ | ○ |
| | A2 | ○ | ◎ | ○ | ○ |
| Sys2 | A3 | ○ | ○ | ◎ | ○ |
| | A4 | ○ | ○ | ○ | ◎ |

CONTROL DEVICE, ELECTRONIC DEVICE, AND CONTROL METHOD

This Nonprovisional application claims priority under 35 U.S.C. § 119 on Patent Application No. 2018-100771 filed in Japan on May 25, 2018, the entire contents of which are hereby incorporated by reference.

TECHNICAL FIELD

The present invention relates to switching between transmitting antennas.

BACKGROUND ART

Patent Literature 1 discloses an example of a technique for reducing an adverse effect, on a human body, of radiation from a transmitting antenna. According to the technique of Patent Literature 1, the following antennas are selected according to a result of determining an open/closed status and a use state of a mobile communication terminal: (i) an antenna to be used for transmission and reception of signals and (ii) an antenna to be used for only reception of signals.

CITATION LIST

Patent Literature

[Patent Literature 1]
Japanese Patent Application Publication, Tokukai, No. 2004-363863

SUMMARY OF INVENTION

Technical Problem

However, according to the technique of Patent Literature 1, the following is true: depending on the transmission strength, there is a possibility that the distribution of a power density or a specific absorption rate (SAR) of an electromagnetic wave radiated from an antenna is concentrated in a case where (i) a mobile communication terminal having a transmission diversity function is used or (ii) a plurality of communication functions are used simultaneously.

It is an object of an aspect of the present invention to achieve a control device capable of suppressing a deterioration of transmission performance and reducing an adverse effect on health of a user, irrespective of the kind of selected antennas.

Solution to Problem

In order to attain the object, a control device in accordance with an aspect of the present invention is configured to control switching between a plurality of transmitting antennas which are included in an electronic device and with which a plurality of signals can be transmitted simultaneously, including: an antenna selecting section, each of the plurality of transmitting antennas being configured to transmit a signal so as to form a density/rate distribution range of a power density or of a specific absorption rate, which density/rate distribution range is specified in advance, the antenna selecting section being configured so that in a case where the plurality of signals are transmitted simultaneously and where the electronic device is in a certain use state, the antenna selecting section selects transmitting antennas to transmit the respective plurality of signals so that respective density/rate distribution ranges have no overlapping portion or have an overlapping portion equal to or less than a certain range.

In order to attain the object, a control method in accordance with an aspect of the present invention is a method of controlling switching between a plurality of transmitting antennas which are included in an electronic device and with which a plurality of signals can be transmitted simultaneously, each of the plurality of transmitting antennas being configured to transmit a signal so as to form a density/rate distribution range of a power density or of a specific absorption rate, which density/rate distribution range is specified in advance, the method including the step of: selecting, in a case where the plurality of signals are transmitted simultaneously and where the electronic device is in a certain use state, transmitting antennas to transmit the respective plurality of signals so that respective density/rate distribution ranges have no overlapping portion or have an overlapping portion equal to or less than a certain range.

Advantageous Effects of Invention

With an aspect of the present invention, it is possible to suppress a deterioration of transmission performance and to reduce an adverse effect on health of a user, irrespective of the kind of selected antennas.

Figure 2:
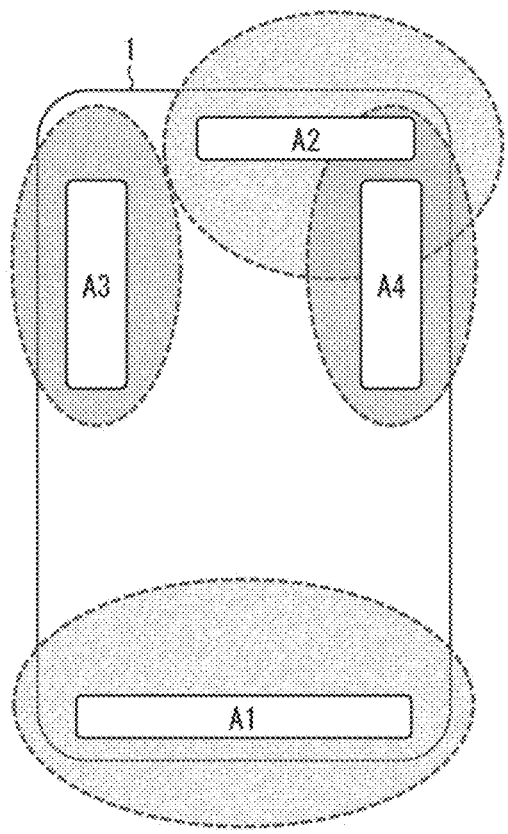

(a) of FIG. 2 is a view illustrating an arrangement of transmitting antennas and distribution ranges of power densities of the transmitting antennas. (b) of FIG. 2 is a view illustrating a condition table in Embodiment 1.

Figure 3:
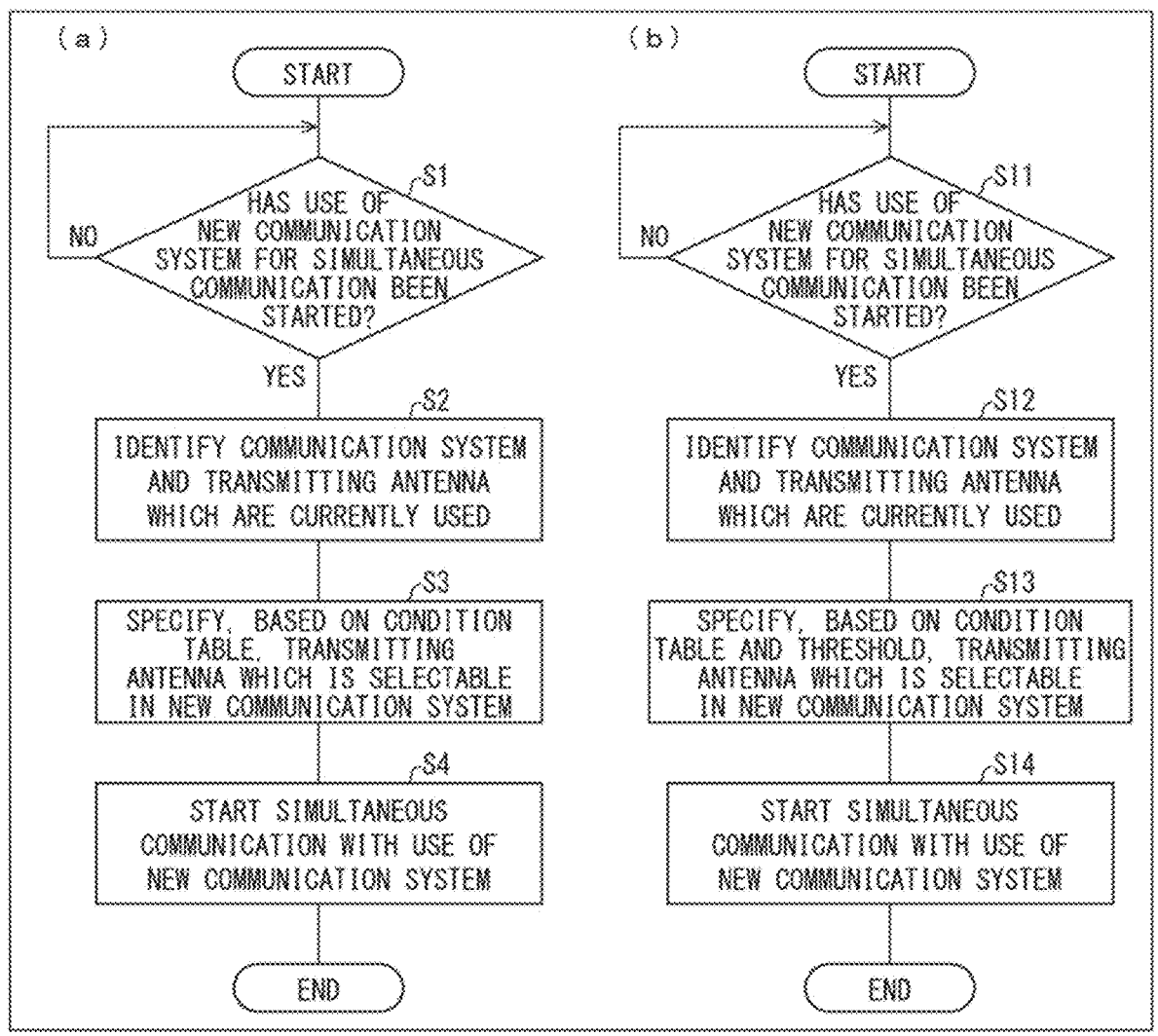

(a) of FIG. 3 is a flowchart illustrating a process performed by the mobile communication terminal in accordance with Embodiment 1. (b) of FIG. 3 is a view illustrating a process performed by a mobile communication terminal in accordance with Embodiment 2.

(a) and (b) of FIG. 4 are views illustrating condition tables in accordance with Embodiment 2.

Figure 5:
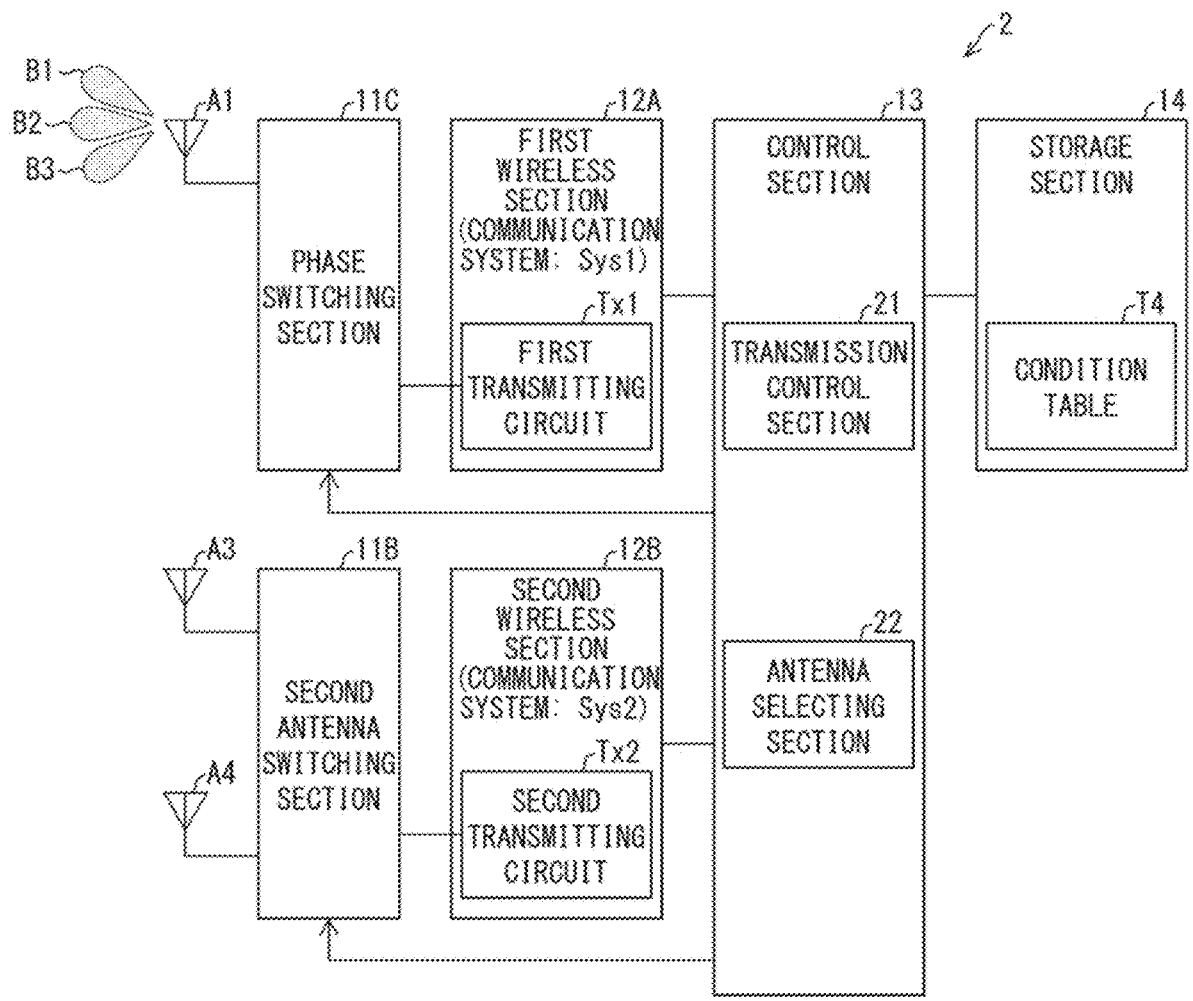

FIG. 5 is a view illustrating a configuration of main components of a mobile communication terminal in accordance with Embodiment 3.

(a) of FIG. 6 is a view illustrating an arrangement of transmitting antennas and distribution ranges of power densities of the transmitting antennas. (b) of FIG. 6 is a view illustrating a condition table in Embodiment 3.

(a) through (d) of FIG. 7 are views illustrating condition tables in accordance with Embodiment 4.

DESCRIPTION OF EMBODIMENTS

Embodiment 1

Figure 1:
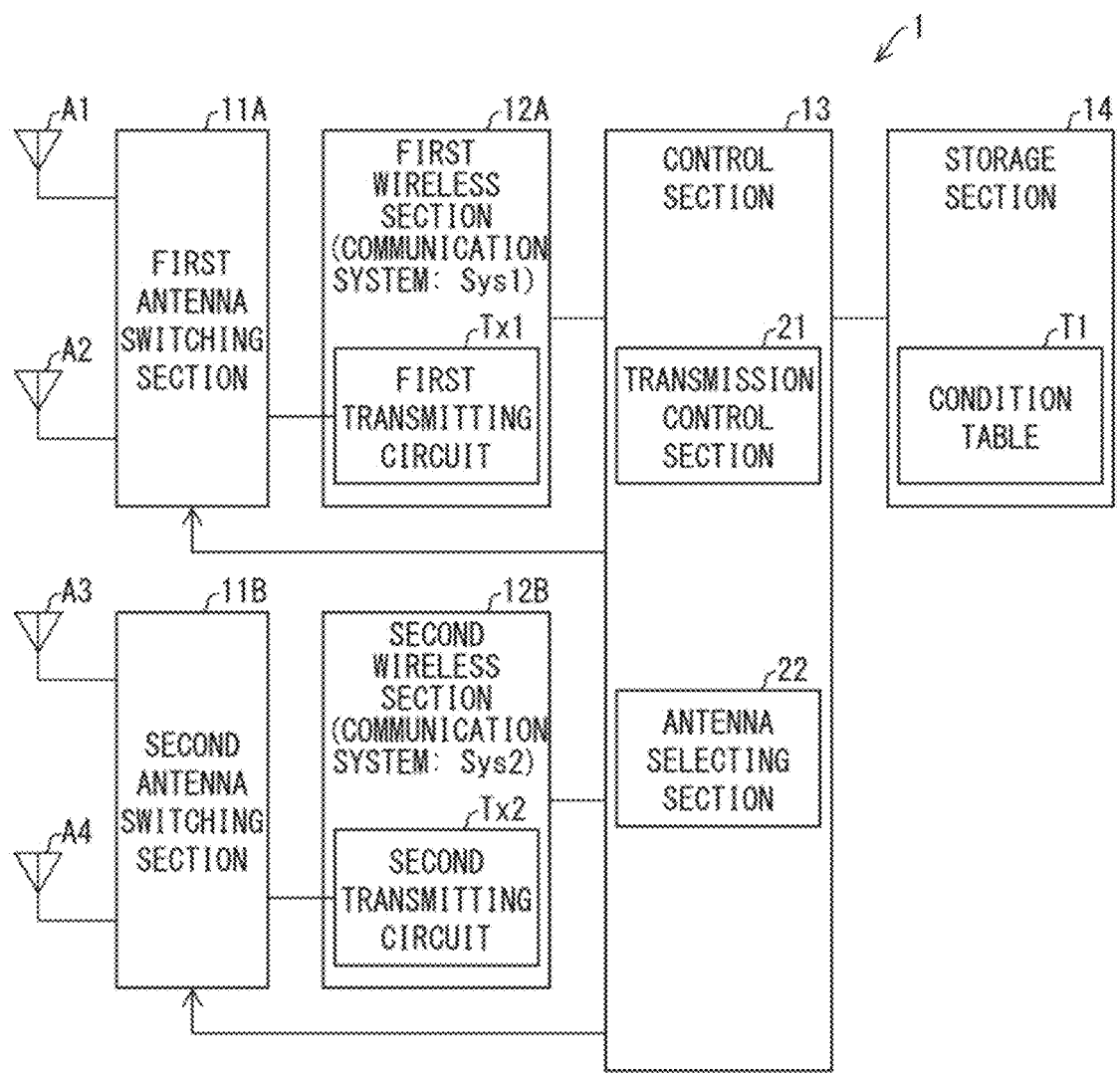
FIG. 1 is a view illustrating a configuration of main components of a mobile communication terminal in accordance with Embodiment 1.

The following description will discuss an embodiment of the present invention in detail. FIG. 1 is a view illustrating a configuration of main components of a mobile communication terminal 1. (a) of FIG. 2 is a view illustrating an arrangement and distribution ranges of power densities of a first antenna A1 through a fourth antenna A4. (b) of FIG. 2 is a view illustrating a condition table T1. (a) of FIG. 3 is a flowchart illustrating a process performed by the mobile communication terminal 1.

The dotted lines in (a) of FIG. 2 indicates the distribution ranges of the power densities. (This also applies to (a) of FIG. 6) Note that in the condition table T1 of (b) of FIG. 2, (i) "⊚" indicates transmitting antennas which are currently used, (ii) "○" indicates transmitting antennas which can be simultaneously used with the transmitting antennas indicated by "⊚", and (iii) "(blank)" indicates transmitting antennas which cannot be simultaneously used with the transmitting antennas indicated by "⊚". This also applies to a condition table T4 (see (b) of FIG. 6) and condition tables T5 through T8 (see FIG. 7).

Each of the embodiments below will be discussed with use of a "distribution range of a power density". However, the "distribution range of a power density" can be read as a "distribution range of a specific absorption rate (SAR) (specifically local SAR)".

<Configuration of Mobile Communication Terminal>

The mobile communication terminal 1 is an electronic device which communicates with an external device, and can transmit a plurality of independent signals simultaneously. As illustrated in FIG. 1, the mobile communication terminal 1 includes, for example, first to fourth antennas A1 through A4, a first antenna switching section 11A, a second antenna switching section 11B, a first wireless section 12A, a second wireless section 12B, a control section 13 (control device), and a storage section 14. The mobile communication terminal 1 can have a function to receive a signal from an external device. The mobile communication terminal 1 is, for example, a mobile phone, a tablet, or a wearable device. The electronic device can be achieved by, instead of the mobile communication terminal 1, a wireless communication device which is not portable.

The first antenna A1 through the fourth antenna A4 are transmitting antennas provided so that a plurality of independent signals can be transmitted simultaneously. In Embodiment 1, the first antenna A1 and the second antenna A2 are connected to the first wireless section 12A via the first antenna switching section 11A. The first antenna A1 and the second antenna A2 transmit, as electromagnetic waves, signals to an external device(s) by radiating electric power generated by the first wireless section 12A. Likewise, the third antenna A3 and the fourth antenna A4 are connected to the second wireless section 12B via the second antenna switching section 11B. The third antenna A3 and the fourth antenna A4 transmit, as electromagnetic waves, signals to an external device(s) by radiating electric power generated by the second wireless section 12B. The number of transmitting antennas is not limited to four, provided that the number is two or more.

The first antenna A1 through the fourth antenna A4 can each serve as a receiving antenna.

The first antenna switching section 11A supplies electric power to at least one of the first antenna A1 and the second antenna A2. The first antenna switching section 11A is, for example, a switching circuit. The first antenna switching section 11A selects the first antenna A1 or the second antenna A2 as a target (transmitting antenna to be used) to which to supply electric power. The first antenna switching section 11A (i.e., the communication system Sys1) can have a transmission diversity function to supply electric power to both the first antenna A1 and the second antenna A2. The second antenna switching section 11B has functions equivalent to those of the first antenna switching section 11A except that targets, to which to supply electric power, are the third antenna A3 and the fourth antenna A4.

The first wireless section 12A performs, in accordance with a certain communication method, a process related to communication with an external device. The first wireless section 12A includes a first transmitting circuit Tx1 configured to generate, in accordance with the communication method of the communication system Sys1, an electromagnetic wave radiated from the first antenna A1 and/or the second antenna A2. The second wireless section 12B and the second transmitting circuit Tx2 also have functions equivalent to those of the first wireless section 12A and the first transmitting circuit Tx1. Note, however, that the second wireless section 12B and the second transmitting circuit Tx2 perform a communication process in accordance with the communication method of the communication system Sys2. The communication systems Sys1 and Sys2 can be different from or identical to each other. Examples of the communication systems encompass Wireless Local Area Network (WLAN) and Wireless Wide Area Network (WWAN). The communication systems of the mobile communication terminal 1 are not limited to the two communication systems Sys1 and Sys2. Alternatively, the mobile communication terminal 1 can have three or more communication systems (each of which includes at least one transmitting antenna). In such a case, an antenna switching section and a wireless section are provided so as to correspond to each communication system.

The control section 13 centrally controls each section of the mobile communication terminal 1. In Embodiment 1, by controlling the first antenna switching section 11A, the second antenna switching section 11B, the first wireless section 12A, and the second wireless section 12B, the control section 13 controls switching between the first antenna A1 through the fourth antenna A4 and controls transmission of signals. Specifically, the control section 13 includes (i) a transmission control section 21 which independently controls the first wireless section 12A and the second wireless section 12B and (ii) an antenna selecting section 22 which independently controls the first antenna switching section 11A and the second antenna switching section 11B.

The storage section 14 stores programs and data used by the control section 13. The storage section 14 stores, for example, a condition table T1. Based on respective positions of the first antenna A1 through the fourth antenna A4 and on respective distributed ranges of power densities formed in a case where signals are transmitted, the condition table T1 specifies transmitting antennas which can be used simultaneously (see (b) of FIG. 2). The condition table T1 is intended to judge whether or not a transmitting antenna(s) other than a certain transmitting antenna is/are used while the certain transmitting antenna is being used.

<Details of Antenna Selecting Section>

In a case where a plurality of signals are transmitted simultaneously and where the mobile communication terminal 1 is in a certain use state, the antenna selecting section 22 selects, as a transmitting antenna(s) to be used for signal transmission, at least one of the first antenna A1 through the fourth antenna A4 having respective power densities whose distribution ranges does not overlap. The antenna selecting section 22 can select at least one of the first antenna A1 through the fourth antenna A4 having respective power densities whose distribution ranges are overlapping at an overlapping portions which is equal to or less than a certain range. The respective distribution ranges of power densities of the first antenna A1 through the fourth antenna A4 are specified in advance. The certain use state refers to a use state which may adversely affect health of a user through concentration of power densities caused by overlapping of distribution ranges of the power densities. Examples of the use state encompass a state in which a user uses the mobile communication terminal 1 while causing the mobile communication terminal 1 to be close to a certain part (e.g., the head). For example, the use state is a call state in which the mobile communication terminal 1 is put to the ear. The certain range refers to a degree to which the distribution ranges overlap so that the health of the user may be adversely affected. The certain use state and the certain range are set by, for example, an experiment for measuring and verifying the SAR value.

Through referring to the condition table T1, the antenna selecting section 22 selects at least one of the first antenna A1 through the fourth antenna A4 as a transmitting antenna to be used for signal transmission. For example, the first antenna A1 through the fourth antenna A4 are arranged as illustrated in (a) of FIG. 2. In addition, the distribution ranges of the power densities of the first antenna A1 through the fourth antenna A4 are formed as illustrated in (a) of FIG. 2. In the present example, an overlapping portion of the distribution ranges of the power densities of the second antenna A2 and the fourth antenna A4 is exceeding a certain range. Therefore, in a case where the second antenna A2 and the fourth antenna A4 are used simultaneously, the electromagnetic waves radiated from these transmitting antennas are locally concentrated to such an extent that the health of the user is adversely affected. The distribution ranges of the power densities of the other transmitting antennas are not overlapping each other.

In this case, the condition table T1 is set as illustrated in (b) of FIG. 2. Specifically, the condition table T1 is configured so that in a case where simultaneous communication is started by the communication system Sys2 while the first antenna A1 is being used, the third antenna A3 and the fourth antenna A4 are both set as selectable transmitting antennas. Meanwhile, in a case where simultaneous communication is started by the communication system Sys2 while the second antenna A2 is being used, (i) only the third antenna A3 is set as a selectable transmitting antenna and (ii) the fourth antenna A4 is set as a transmitting antenna which is not selectable. Similar settings apply to a case where simultaneous communication is started by the communication system Sys1 while the communication system Sys2 is being used.

It is also possible that the condition table T1 further includes conditions such as (i) frequency bands used by the communication systems Sys1 and Sys2 or (ii) power reductions in the communication systems Sys1 and Sys2. In such a case, the antenna selecting section 22 can select, based on distribution ranges of power densities also in view of the further conditions, a transmitting antenna to be used for signal transmission.

<Process Performed by Mobile Communication Terminal (Control Method)>

As illustrated in (a) of FIG. 3, the antenna selecting section 22 monitors detection of a start of use of a new communication system which performs communication simultaneously with a communication system which is currently used (S1). The antenna selecting section 22 continues a process of S1 until a start of use of the new communication system is detected (NO in S1). In a case where the start of the use of the new communication system is detected (YES in S1), the antenna selecting section 22 identifies the communication system and the transmitting antenna which are currently used. Subsequently, based on the condition table T1, the antenna selecting section 22 identifies a selectable transmitting antenna in the new communication system (S3: antenna selecting step). Specifically, the antenna selecting section 22 selects the following transmitting antenna: (i) a transmitting antenna having a power density whose distribution range does not overlap with that of the currently used antenna or (ii) a transmitting antenna having a power density whose distribution range overlaps with that of the currently used antenna at an overlapping portion which is equal to or less than a certain range. Subsequently, the antenna selecting section 22 transmits, to an antenna switching section (the first antenna switching section 11A or the second antenna switching section 11B) which operates in the new communication system, information indicating the transmitting antenna which has been selected. The antenna switching section selects, as a transmitting antenna for supplying electric power, the transmitting antenna indicated by the information. In a case where the selection by the antenna selecting section 22 is completed, the transmission control section 21 instructs the wireless section (the first wireless section 12A or the second wireless section 12B), which operates in the new communication system, to start communication in the new communication system. This causes the wireless section to start communication in the new communication system (S4).

For example, assumed that (i) a communication system currently used is the communication system Sys1 and (ii) a new communication system to be used is the communication system Sys2. In this case, in a case where the antenna selecting section 22 detects that use of the communication system Sys2 is started in S1, the antenna selecting section 22 identifies that the communication system currently used is the communication system Sys1. Then, in a case where the antenna selecting section 22 identifies that the transmitting antenna currently used is the first antenna A1, the antenna selecting section 22 refers to the condition table T1 so as to identify, as transmitting antennas which are usable for signal transmission, the third antenna A3 and the fourth antenna A4 having power densities whose distribution ranges do not overlap with that of the first antenna A1. In this case, according to a rule set in advance (e.g., an order of priority for use), the antenna selecting section 22 selects the third antenna A3 or the fourth antenna A4 as a transmitting antenna to be used for signal transmission. In a case where the second antenna switching section 11B has a transmission diversity function, the third antenna A3 and the fourth antenna A4 can both be selected as transmitting antennas to be used for signal transmission. Meanwhile, in a case where the antenna selecting section 22 identifies that the transmitting antenna currently used is the second antenna A2, the antenna selecting section 22 refers to the condition table T1 so as to identify, as a transmitting antenna which can be selected for signal transmission, only the third antenna A3 having a power density whose distribution range does not overlap with that of the second antenna A2.

The control section 13 is thus configured so as to (i) specify a communication system currently used and a new communication system to be used and then (ii) selects, according to a degree of overlapping of distribution ranges of the power densities, at least one of the first antennas A1 through the fourth antenna A4 as a transmitting antenna(s) to be used for signal transmission. Therefore, even in a case where simultaneous communication is performed with use of a plurality of communication systems, a transmitting antenna(s) to be used for signal transmission can be selected so as to prevent deterioration in transmission performance of each communication system. A transmitting antenna(s) to be used for signal transmission can also be selected so that the power densities are not locally concentrated (i.e., so that the power densities are dispersed).

Note, however, that the mobile communication terminal 1 does not need to have a plurality of communication systems. For example, the mobile communication terminal 1 can have one communication system which uses differing frequency bands in transmission of signals (i.e., includes transmitting antennas corresponding to the respective frequency bands). That is, irrespective of the number of communication systems included in the mobile communication terminal 1, the control section 13 selects, according to the degree of overlapping of any two transmitting antennas, two or more transmitting antennas which can be used simultaneously. Therefore, irrespective of the number of communication systems and irrespective the kind of the selected transmitting antennas, the control section 13 can select a transmitting antenna(s) to be used for signal transmission so that (i) the transmission performance of the mobile communication terminal 1 does not deteriorate and (ii) power densities are not locally concentrated. Therefore, the control section 13 can suppress the deterioration of the transmission performance and reduce the adverse effect on the health of the user. It can also be said that the control section 13 can derive the optimum transmission performance of a communication system while suppressing the adverse effect. In addition, the control section 13 does not need to perform the following operations for preventing power densities from being concentrated: (i) adjusting transmission power to be equal to or less than a reference value, (ii) decreasing transmission performance of a transmitting antenna to be used, and (iii) selecting a transmitting antenna whose transmission performance is inferior to that of a transmitting antenna which is desirably used.

Embodiment 21

The following description will discuss another embodiment of the present invention. For convenience, members which are identical in function to the members described in the previous embodiments are given respective identical reference signs, and descriptions of those members are not repeated. This also applies to Embodiment 2 and subsequent embodiments.

(b) of FIG. 3 is a view illustrating a process performed by a mobile communication terminal 1 in accordance with Embodiment 2. (a) and (b) of FIG. 4 are views illustrating condition tables T2 and T3, respectively. In Embodiment 2 also, it is assumed that the positions of the first antenna A1 through the fourth antenna A4 and the distribution ranges of the power densities are as illustrated in (a) of FIG. 2.

According to the mobile communication terminal 1 in accordance with Embodiment 2, a condition table T2 illustrated in (a) of FIG. 4 instead of the condition table T1 is stored in a storage section 14. Through referring to the condition table T2, an antenna selecting section 22 selects a transmitting antenna to be used for signal transmission. As with the condition table T1, the condition table T2 identifies the transmitting antennas which can be used simultaneously, based on (i) the respective positions of the first antenna A1 through the fourth antenna A4 and (ii) the distribution ranges of the power densities of the first antenna A1 through the fourth antenna A4. Note, however, that weighting values are set in the condition table T2.

The weighting values are parameters decided in view of various factors related to signal transmission. The weighting values are parameters obtained from, for example, the following factors: (i) positions and characteristics of the first antenna A1 through the fourth antenna A4 (e.g., transmission performance and directivity); (ii) characteristics of the communication systems Sys1 and Sys2 (e.g., frequency band); and (iii) distribution ranges of power densities of the first antenna A1 through the fourth antenna A4 obtained by verification and measurement for each mobile communication terminal 1 (or each model thereof). In the present example, a weighting value is an index representing the degree of concentration of the power densities caused by the overlapping of the distribution ranges of the power densities between any two transmitting antennas. For example, the weighting values are set to be higher in a case where distances between two antennas of the first antenna A1 and the fourth antenna A4 are shorter. In addition, the weighting values are set to be higher in a case where transmitting antennas used in a communication system have higher transmission strength. Note that the availability/unavailability of the condition table T1 of Embodiment 1 can be set, based on the weighting values. In such a case, the condition table T1 is set to be (i) usable in a case where a weighting value is equal to or less than a threshold and (ii) unusable in a case where the weighting value exceeds the threshold.

In addition to the condition table T2, a threshold(s) for selecting a usable transmitting antenna is stored in the storage section 14. The threshold is set, through experiment or the like, so as to select at least one of the following first antenna A1 through the fourth antenna A4 which have power densities whose distribution ranges have no overlapping portion or have an overlapping portion which is equal to or less than a certain range. In the example of the condition table T2 illustrated in (a) of FIG. 4, it is assumed that a threshold is set to, for example, 100.

The mobile communication terminal 1 performs, for example, the process illustrated in (b) of FIG. 3. Specifically, the antenna selecting section 22 first performs processes equivalent to those in S1 and S2 (S11 and S12). After the process of S12, based on the condition table T2 and on the threshold, the antenna selecting section 22 identifies a selectable transmitting antenna in a new communication system (S13). Specifically, based on a result of a comparison between the weighting values and the threshold, the antenna selecting section 22 selects the following transmitting antenna: (i) a transmitting antenna having a power density whose distribution range does not overlap with that of the currently used antenna or (ii) a transmitting antenna having a power density whose distribution range overlaps with that of the currently used antenna at an overlapping portion which is equal to or less than a certain range. Subsequently, the antenna selecting section 22 and the transmission control section 21 perform processes equivalent to those of S4 so that communication in the new communication system with use of the selected transmitting antenna starts (S14).

For example, assumed that (i) a communication system currently used is the communication system Sys1 and (ii) a new communication system to be used is the communication system Sys2. In this case, in a case where the antenna selecting section 22 detects that use of the communication system Sys2 is started in S11, the antenna selecting section 22 identifies that the communication system currently used is the communication system Sys1. Subsequently, the antenna selecting section 22 judges refers to the condition table T2 and the threshold (e.g., 100) so as to determine whether or not the third antenna A3 and/or the fourth antenna A4 is/are usable.

In a case where the first antenna A1 is identified as the transmitting antenna currently used, the condition table T2 shows that (i) the weighting value of the third antenna A3 while the first antenna A1 is being used is 40 and (ii) the weighting value of the fourth antenna A4 while the first antenna A1 is being used is 50. Since the weighting values are equal to or less than the threshold, the antenna selecting section 22 identifies the third antenna A3 and the fourth antenna A4 as transmitting antennas which are usable for signal transmission. As in Embodiment 1, according to a rule set in advance, the antenna selecting section 22 selects the third antenna A3 or the fourth antenna A4 as a transmitting antenna to be used for signal transmission. The sum of the respective weighting values of the third antenna A3 and the fourth antenna A4 is 90 which is equal to or less than the threshold. Therefore, in a case where the second antenna switching section 11B has a transmission diversity function, the antenna selecting section 22 can select both the third antenna A3 and the fourth antenna A4 as transmitting antennas to be used for signal transmission.

Meanwhile, in a case where the second antenna A2 is identified as the transmitting antenna currently used, (i) the weighting value of the third antenna A3 while the second antenna A2 is being used is 70 and (ii) the weighting value of the fourth antenna A4 while the second antenna A2 is being used is 110. In this case, although the weighting value of the third antenna A3 is equal to or less than the threshold, the weighting value of the fourth antenna A4 is exceeding the threshold. Therefore, the antenna selecting section 22 selects only the third antenna A3 as a transmitting antenna to be used for signal transmission.

According to Embodiment 2, the control section 13 thus makes comparisons between (i) the weighting values decided based on various factors involved in signal transmission and (ii) the threshold. Through this comparison, the control section 13 can select the following transmitting antenna: (i) a transmitting antenna having a power density whose distribution range does not overlap with that of the currently used antenna or (ii) a transmitting antenna having a power density whose distribution range overlaps with that of the currently used antenna at an overlapping portion which is equal to or less than a certain range. Therefore, in Embodiment 2 also, a transmitting antennas to be used for signal transmission can be selected so that the power densities are not locally concentrated.

Furthermore, in a case where the number of the communication systems and the number of the transmitting antennas included in the mobile communication terminal 1 are higher, a higher number of combinations of transmitting antennas are subjected to judging as to usability. In this case, in order to maximize the transmission performance of the mobile communication terminal 1, it is necessary to set parameters of the transmitting antennas in view of the various factors described above. According to Embodiment 2, as described above, the weighting values are set in view of various factors, and the control section 13 selects transmitting antennas with use of the weighting values. Therefore, even in a case where the number of communication systems and the number of transmitting antennas are high, the transmitting antenna to be used for signal transmission can still be selected so that (i) the transmission performance does not deteriorate and (ii) the power densities are not locally concentrated. In particular, in a case where the mobile communication terminal 1 is compatible with transmission diversity, a plurality of transmitting antennas can be used simultaneously in a single communication system. Therefore, in the mobile communication terminal 1 which is compatible with transmission diversity, it is particularly useful to select a transmitting antenna, which is to be used for signal transmission, based on a weighting value set in view of various factors.

<Variation>

In the storage section 14, a condition table T3 illustrated in (b) of FIG. 4 instead of the condition table T2 can be stored. The condition table T3 is obtained by simplifying the condition table T2. Weighting values of the condition table T3 are each an index for calculating the degree of concentration of the power densities caused by how overlapping of the distribution ranges of the power densities overlap between any two transmitting antennas. The threshold (e.g., 100) of the present variation is set as a value to be compared with the sum of any two weighting values.

For example, assumed that (i) a communication system currently used is the communication system Sys1 and (ii) a new communication system to be used is the communication system Sys2. In a case where the first antenna A1 is used, the condition table T3 shows that (i) the sum of the weighting values of the first antenna A1 and the third antenna A3 is 70 and (ii) the sum of the weighting values of the first antenna A1 and the fourth antenna A4 is 90. Since the sums are each equal to or less than the threshold, the antenna selecting section 22 can select any of the third antenna A3 and the fourth antenna A4 as transmitting antennas which are usable for signal transmission. Meanwhile, in a case where the second antenna A2 is used, (i) a first sum of the weighting values of the second antenna A2 and the third antenna A3 is 90 and (ii) a second sum of the weighting values of the second antenna A2 and the fourth antenna A4 is 110. In this case, although the first sum is equal to or less than the threshold, the second sum exceeds the threshold. Therefore, the antenna selecting section 22 selects only the third antenna A3 as a transmitting antenna to be used for signal transmission.

As has been described, the transmitting antenna to be used for signal transmission can be selected also by the simple condition table T3 so that (i) the transmission performance does not deteriorate and (ii) the power densities are not locally concentrated. The simple condition table T3 is particularly useful in a mobile communication terminal 1 which is simply configured so that, for example, (i) the number of communication systems and the number of transmitting antennas are relatively small and/or (ii) the antenna switching section switches between transmitting antennas so as to select one transmitting antenna.

Embodiment 31

FIG. 5 is a view illustrating a configuration of main components of a mobile communication terminal 2. (a) of FIG. 6 is a view illustrating an arrangement and distribution ranges of power densities of a first antenna A1, a third antenna A3, and a fourth antenna A4. (b) of FIG. 6 is a view illustrating a condition table T4. As illustrated in FIG. 5, the first antenna A1 is the only transmitting antenna used in a communication system Sys1. The mobile communication terminal 2 includes a phase switching section 11C instead of the first antenna switching section 11A. The storage section 14 stores the condition table T4 instead of the condition table T1.

The phase switching section 11C serves as an antenna adjusting device configured to adjust a distribution range of a power density. The phase switching section 11C changes a phase of a signal transmitted from the first antenna A1, so that the phase switching section 11C changes a transmission direction (beam direction) of the signal. That is, the phase switching section 11C changes directivity of the first antenna A1. Alternatively, the phase switching section 11C can be a polarization plane changing section configured to change the directivity of the first antenna A1 by changing a polarization plane of the signal. The first antenna A1 is a transmitting antenna (e.g., an array antenna) capable of changing a transmission direction of a signal.

The condition table T4 identifies, at least based on the following factors, transmitting antennas which can be used simultaneously: (i) a transmission direction of a signal transmitted from the first antenna A1 and (ii) a distribution range of a power density formed by the signal. Through referring to the condition table T4, the antenna selecting section 22 selects, as a transmitting antenna to be used for signal transmission, at least one of the first antenna A1, the third antenna A3, and the fourth antenna A4.

For example, the first antenna A1, the third antenna A3, and the fourth antenna A4 are arranged as illustrated in (a) of FIG. 6. In addition, the distribution ranges of the power densities of the first antenna A1, the third antenna A3, and the fourth antenna A4 are formed as illustrated in (a) of FIG. 6. In the present example, a transmission direction of a signal transmitted from the first antenna A1 can be switched between three directions. A first beam B1 is a signal transmitted from the first antenna A1 in a direction toward directly above or below the first antenna A1 (i.e., a direction substantially perpendicular to the drawing). A second beam B2 and a third beam B3 are signals transmitted from the first antenna A1 in directions extending obliquely to the direction toward directly above or below the first antenna A1. An angle between the respective transmission directions of the first beam B1 and the third beam B3 is larger than an angle between the respective transmission directions of the first beam B1 and the second beam B2. That is, the distribution range of the power density of the first beam B1 is formed in the vicinity of the first antenna A1. The distribution range of the power density of the second beam B2 is formed so as to be away from the first antenna A1. The distribution range of the power density of the third beam B3 is formed so as to be further away from the first antenna A1. The distribution range of the power density of the third antenna A3 is formed in the vicinity of the third antenna A3. The distribution range of the power density of the fourth antenna A4 is formed in the vicinity of the fourth antenna A4.

In the present example, the distribution range of the power density of the second beam B2 transmitted from the first antenna A1 and the distribution range of the power density of the third antenna A3 overlap at an overlapping portion which exceeds a certain range. In addition, in the present example, the distribution range of the power density of the third beam B3 transmitted from the first antenna A1 and the distribution range of the power density of the fourth antenna A4 overlap at an overlapping portion which exceeds a certain range. Therefore, in any of the following cases, electromagnetic waves transmitted from transmitting antennas are locally concentrated: (i) a case where the third antenna A3 is used simultaneously with the first antenna A1 which is transmitting the second beam B2 or (ii) a case where the fourth antenna A4 is used simultaneously with the first antenna A1 which is transmitting the third beam B3.

In this case, the condition table T4 is set as illustrated in (b) of FIG. 6. Specifically, the condition table T4 is configured so that in a case where simultaneous communication is started by the communication system Sys2 while the first antenna A1 is transmitting the first beam B1, the third antenna A3 and the fourth antenna A4 are both set as usable transmitting antennas. Meanwhile, in a case where simultaneous communication is started by the communication system Sys2 while the first antenna A1 is transmitting the second beam B2, (i) only the fourth antenna A4 is set as a selectable transmitting antenna and (ii) the third antenna A3 is set as a transmitting antenna which is not selectable. Likewise, in a case where simultaneous communication is started by the communication system Sys2 while the first antenna A1 is transmitting the third beam B3, (i) only the third antenna A3 is set as a selectable transmitting antenna and (ii) the fourth antenna A4 is set as a transmitting antenna which is not selectable. Similar settings apply to a case where simultaneous communication is started by the communication system Sys1 while the communication system Sys2 is being used.

As in Embodiment 1, the mobile communication terminal 2 performs, for example, the process illustrated in (a) of FIG. 3. Note, however, that the processes of S2 through S4 differ from Embodiment 1 in the following points. Specifically, in S2, the antenna selecting section 22 identifies a communication system and a transmitting antenna which are currently used. In addition, in S2, in a case where the identified transmitting antenna has directivity (i.e., the first antenna A1 in Embodiment 2), the antenna selecting section 22 identifies a transmission direction of the signal. Then, based on the condition table T4, the antenna selecting section 22 identifies a selectable transmitting antenna in the new communication system (S3). Subsequently, the antenna selecting section 22 transmits, to the phase switching section 11C or the second antenna switching section 11B which operate in a new communication system, information indicating (i) the transmitting antenna which has been selected and/or (ii) the transmission direction. The second antenna switching section 11B selects, as a transmitting antenna for supplying electric power, the transmitting antenna indicated by the information. The phase switching section 11C then (i) selects the first antenna A1 and (ii) selects, as the transmission direction of the signal, the transmission direction indicated by the information.

For example, assumed that (i) a communication system currently used is the communication system Sys1 and (ii) a new communication system to be used is the communication system Sys2. Then, in a case where the transmitting antenna currently used is the first antenna A1 and where the first antenna A1 is transmitting the first beam B1, the antenna selecting section 22 refers to the condition table T4 so as to identify, as transmitting antennas which are usable for signal transmission, the third antenna A3 and the fourth antenna A4 having power densities whose distribution ranges do not overlap with that of the first antenna A1. In this case, as in Embodiment 1, the antenna selecting section 22 selects, as a transmitting antenna(s) to be used for signal transmission, the third antenna A3 and/or the fourth antenna A4. Likewise, in a case where the first antenna A1 is transmitting the second beam B2, the antenna selecting section 22 identifies, as a transmitting antenna to be used for signal transmission, the fourth antenna A4 having a power density whose distribution range does not overlap that of the first antenna A1. In addition, in a case where the first antenna A1 is transmitting the third beam B3, the antenna selecting section 22 identifies, as a transmitting antenna to be used for signal transmission, the third antenna A3 having a power density whose distribution range does not overlap that of the first antenna A1.

As has been described, in a case where the mobile communication terminal 2 has a transmitting antenna whose directivity can be changed, the control section 13 selects, in view of a distribution range of a power density formed according to the directivity, a transmitting antenna to be used for signal transmission. In a case where the transmitting antenna thus selected has directivity, a transmission direction of a signal is also selected. That is, selection of a transmitting antenna to be used for signal transmission involves selection of a transmission direction. With this configuration, the transmitting antenna, which is to be used for signal transmission, and/or a transmission direction of a signal can be selected so that (i) the transmission performance does not deteriorate and (ii) the power densities are not locally concentrated.

Note that in Embodiment 3, only the first antenna A1 has been discussed as a transmitting antenna capable of changing a transmission direction of a signal. However, the present invention is not limited to such a configuration. The third antenna A3 or the fourth antenna A4 can be a transmitting antenna capable of changing a transmission direction of a signal. That is, according to the mobile communication terminal 2, at least one of a plurality of transmitting antennas needs to be able to change the transmission direction.

As in Embodiment 2, the condition table T4 can be set with use of weighting values. In such a case, the weighting values are set in view of transmission directions (directivity) of signals. For example, a weighting value is set higher in a case where a degree to which the following distribution ranges overlap increases: (i) a distribution range of a power density, which distribution range is formed by each signal transmitted from the first antenna A1, and (ii) a distribution range of a power density of the third antenna A3 or the fourth antenna A4. In a case where the condition table T4 is set with use of weighting values, the antenna selecting section 22 selects, by comparing the weighting values of the condition table T4 with a threshold set in advance, a transmitting antenna to be used for signal transmission (and/or a transmission direction of a signal). The threshold is set, through experiment or the like, so as to select a transmitting antenna and a transmission direction are selected so that a distribution range of a power density, which distribution range is formed by each of the signals of the first antenna A1, either (i) does not overlap a distribution range of a power density of the third antenna A3 or the fourth antenna A4 or (ii) overlaps the distribution range of the power density of the third antenna A3 or the fourth antenna A4 at an overlapping portion which is equal to or less than a certain range.

Embodiment 41

Embodiment 1 discussed an example in which a transmitting antenna(s) to be used for signal transmission is/are selected in a case where a use state of the mobile communication terminal 1 is a certain use state (e.g., a call state). Note, however, that various states are possible as the use state of the mobile communication terminal 1. Embodiment 4 will discuss an example in which a condition table is prepared for each use state (i.e., use case). (a) through (d) of FIG. 7 are views illustrating condition tables T5 through T8. It is assumed that positions of the first antenna A1 through the fourth antenna A4 and the distribution ranges of the power densities of the first antenna A1 through the fourth antenna A4 are as illustrated in (a) of FIG. 2. That is, the distribution ranges of the power densities of the second antenna A2 and the fourth antenna A4 overlap at an overlapping portion which exceeds a certain range.

The condition table T5 illustrated in (a) of FIG. 7 is an example of a case where the use state is a call state. The condition table T5 is identical to the condition table T1. In this case, the condition table T5 shows that as described in Embodiment 1, the second antenna A2 and the fourth antenna A4 cannot be used simultaneously.

The condition table T6 illustrated in (b) of FIG. 7 is an example of a case where the use state is a terminal-holding state (excluding the call state). In this case also, the second antenna A2 and the fourth antenna A4 cannot be used simultaneously. However, the condition table T6 shows the third antenna A3 and the fourth antenna A4 can be used simultaneously in a case where the communication system Sys2 is used. This is because of the following reason. Specifically, in a case where the use state is the terminal-holding state excluding the call state, a distance between the mobile communication terminal 1 and a user is larger in comparison with in the call state. Consequently, among distribution ranges in which power densities are concentrated, a distribution range to affect the user is made narrow. This causes an adverse effect on health of the user to be small even in a case where the third antenna A3 and the fourth antenna A4 are used simultaneously.

The condition table T7 illustrated in (c) of FIG. 7 is an example of a case where the use state is a moving image-viewing state. " . . . " in (c) of FIG. 7 indicates that availability/unavailability of the transmitting antennas are set as appropriate for each mobile communication terminal 1. The availability/unavailability is set in view of, for example, (i) a communication system used while a moving image is being viewed and (ii) an orientation of the mobile communication terminal 1 while the moving image is being viewed. The availability/unavailability can be set as appropriate according to various use states in addition to viewing of a moving image.

The condition table T8 illustrated in (d) of FIG. 7 is an example of a case where the use state is a state in which a user and the mobile communication terminal 1 are not in close proximity to each other. In this use state, irrespective of the degrees of concentrations of the power densities, any combinations of the first antenna A1 through the fourth antenna A4 can be used.

That is, in Embodiment 4, in a case where the use state of the mobile communication terminal 1 is not a certain use state (e.g., a call state), the antenna selecting section 22 also includes, in selection targets, transmitting antennas having power densities whose distribution ranges overlap at an overlapping portion which exceeds a certain range. For example, the condition table T8 shows that the antenna selecting section 22 can select, as transmitting antennas which can be used simultaneously, the second antenna A2 and the fourth antenna A4 having power densities whose distribution ranges overlap at an overlapping portion which exceeds a certain range. Therefore, in addition to the effects described in Embodiment 1, the effect of being able to increase the degree of freedom in selection of transmitting antennas can be obtained because the transmitting antennas can be selected according to the use state. Note that the condition tables T5 through T8 can be weighting tables in which weighting values are set as in Embodiment 2. Alternatively, the condition tables T5 through T8 can be tables set in view of directivity of the transmitting antennas as in Embodiment 3.

[Software Implementation Example]

Control blocks of the mobile communication terminals 1 and 2 (particularly, each section of the control section 13) can be realized by a logic circuit (hardware) provided in an integrated circuit (IC chip) or the like or can be alternatively realized by software.

In the latter case, the mobile communication terminals 1 and 2 each include a computer that executes instructions of a program that is software realizing the foregoing functions. The computer, for example, includes at least one processor (control device) and at least one computer-readable storage medium in which the program is stored. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

[Recap]

A control device (control section 13) in accordance with Aspect 1 of the present invention is configured to control switching between a plurality of transmitting antennas (first antenna A1 through fourth antenna A4) which are included in an electronic device (mobile communication terminal 1, 2) and with which a plurality of signals can be transmitted simultaneously, including: an antenna selecting section (22), each of the plurality of transmitting antennas being configured to transmit a signal so as to form a density/rate distribution range of a power density or of a specific absorption rate, which density/rate distribution range is specified in advance, the antenna selecting section being configured so that in a case where the plurality of signals are transmitted simultaneously and where the electronic device is in a certain use state, the antenna selecting section selects transmitting antennas to transmit the respective plurality of signals so that respective density/rate distribution ranges have no overlapping portion or have an overlapping portion equal to or less than a certain range. With the configuration, it is possible to suppress a deterioration of transmission performance and to suppress an adverse effect on health of a user, irrespective of the kind of selected transmitting antennas.

A control device in accordance with Aspect 2 of the present invention can be configured in Aspect 1 so that: a condition table is stored, the condition table being configured to specify, based on respective positions and respective density/rate distribution ranges of the plurality of transmitting antennas, transmitting antennas which can be used simultaneously; and the antenna selecting section is configured to refer to the condition table (T1 through T8) so as to select the transmitting antennas which can be used simultaneously. With the configuration, it is possible to select transmitting antennas in view of the respective positions of the transmitting antennas.

A control device in accordance with Aspect 3 of the present invention can be configured in Aspect 1 so that: at least one (first antenna A1) of the plurality of transmitting antennas is capable of changing a direction in which (i) a signal is transmitted and (ii) a density/rate distribution range is formed; a condition table (T4) is stored, the condition table being configured to specify, based at least on the direction and on the density/rate distribution range, transmitting antennas which can be used simultaneously; and the antenna selecting section is configured to refer to the condition table so as to select the transmitting antennas which can be used simultaneously. With the configuration, it is possible to select transmitting antennas in view of directions in which signals are transmitted.

A control device in accordance with Aspect 4 of the present invention can be configured in any one of Aspects 1 through 3 so that in a case where the electronic device is not in the certain use state, the antenna selecting section further includes, in selection targets, transmitting antennas so that respective density/rate distribution ranges have an overlapping portion exceeding the certain range. With the configuration, it is possible to increase the degree of freedom in selecting transmitting antennas.

An electronic device in accordance with Aspect 5 of the present invention includes: the control device in accordance with any one of Aspects 1 through 4. A control method in accordance with Aspect 6 of the present invention is a method of controlling switching between a plurality of transmitting antennas which are included in an electronic device and with which a plurality of signals can be transmitted simultaneously, each of the plurality of transmitting antennas being configured to transmit a signal so as to form a density/rate distribution range of a power density or of a specific absorption rate, which density/rate distribution range is specified in advance, the method including the step of: selecting, in a case where the plurality of signals are transmitted simultaneously and where the electronic device is in a certain use state, transmitting antennas to transmit the respective plurality of signals so that respective density/rate distribution ranges have no overlapping portion or have an overlapping portion equal to or less than a certain range. With the configuration and the method, an effect similar to that of Aspect 1 is obtained.

The control device in accordance with each of the foregoing aspects of the present invention can be realized by a computer. In such a case, the following can be encompassed in the scope of the present invention: a control program for the control device which program causes a computer to operate as each section (software element) of the control device so that the control device can be realized by the computer; and a computer-readable storage medium in which the control program is stored.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 1, 2 Mobile communication terminals (electronic devices)
13 Control section (control device)
22 Antenna selecting section
A1 First antenna (transmitting antenna)
A2 Second antenna (transmitting antenna)
A3 Third antenna (transmitting antenna)
A4 Fourth antenna (transmitting antenna)
T1 through T8 Condition table

The invention claimed is:

1. A control device configured to control switching between a plurality of transmitting antennas which are included in an electronic device and with which a plurality of signals can be transmitted simultaneously, comprising:
an antenna selecting section,
each of the plurality of transmitting antennas being configured to transmit a signal so as to form a density/rate distribution range of a power density or of a specific absorption rate, which density/rate distribution range is specified in advance, the antenna selecting section being configured so that in a case where the plurality of signals are transmitted simultaneously and where the electronic device is in a certain use state, the antenna selecting section selects transmitting antennas to transmit the respective plurality of signals so that respective density/rate distribution ranges have no overlapping portion or have an overlapping portion equal to or less than a certain range.

2. The control device according to claim 1, wherein:

a condition table is stored, the condition table being configured to specify, based on respective positions and respective density/rate distribution ranges of the plurality of transmitting antennas, transmitting antennas which can be used simultaneously; and the antenna selecting section is configured to refer to the condition table so as to select the transmitting antennas which can be used simultaneously.

3. The control device according to claim 1, wherein:

at least one of the plurality of transmitting antennas is capable of changing a direction in which (i) a signal is transmitted and (ii) a density/rate distribution range is formed;

a condition table is stored, the condition table being configured to specify, based at least on the direction and on the density/rate distribution range, transmitting antennas which can be used simultaneously; and the antenna selecting section is configured to refer to the condition table so as to select the transmitting antennas which can be used simultaneously.

4. The control device according to claim 1, wherein in a case where the electronic device is not in the certain use state, the antenna selecting section further includes, in selection targets, transmitting antennas so that respective density/rate distribution ranges have an overlapping portion exceeding the certain range.

5. An electronic device comprising:

the control device according to claim 1.

6. A method of controlling switching between a plurality of transmitting antennas which are included in an electronic device and with which a plurality of signals can be transmitted simultaneously, each of the plurality of transmitting antennas being configured to transmit a signal so as to form a density/rate distribution range of a power density or of a specific absorption rate, which density/rate distribution range is specified in advance, said method comprising the step of:

selecting, in a case where the plurality of signals are transmitted simultaneously and where the electronic device is in a certain use state, transmitting antennas to transmit the respective plurality of signals so that respective density/rate distribution ranges have no overlapping portion or have an overlapping portion equal to or less than a certain range.

* * * * *